(12) United States Patent
Ferguson

(10) Patent No.: US 8,220,127 B2
(45) Date of Patent: Jul. 17, 2012

(54) REPLACEMENT OF STEERING RACK BOOTS

(75) Inventor: Scott Ferguson, Glen Waverley (AU)

(73) Assignee: Ashwood River Pty Ltd, Scoresby, Victoria (AU)

( * ) Notice: Subject to any disclaimer, the term of this patent is extended or adjusted under 35 U.S.C. 154(b) by 1432 days.

(21) Appl. No.: 10/592,449

(22) PCT Filed: Feb. 22, 2005

(86) PCT No.: PCT/AU2005/000230
§ 371 (c)(1),
(2), (4) Date: May 24, 2007

(87) PCT Pub. No.: WO2005/085027
PCT Pub. Date: Sep. 15, 2005

(65) Prior Publication Data
US 2007/0261223 A1   Nov. 15, 2007

(30) Foreign Application Priority Data

Mar. 10, 2004   (AU) ................. 2004901252

(51) Int. Cl.
*B23P 11/02*   (2006.01)
*B23P 19/02*   (2006.01)
(52) U.S. Cl. .............. 29/450; 29/235; 29/402.02
(58) Field of Classification Search ............. 29/450, 29/455, 235, 402.02, 454
See application file for complete search history.

(56) References Cited

U.S. PATENT DOCUMENTS

| | | | | |
|---|---|---|---|---|
| 1,818,030 A * | 8/1931 | Arnold | ............. | 383/40 |
| 1,922,431 A * | 8/1933 | Geyer | ............. | 464/175 |
| 3,381,987 A * | 5/1968 | Husen | ............. | 403/51 |
| 4,107,952 A * | 8/1978 | Geisthoff | ............. | 464/175 |
| 4,708,272 A * | 11/1987 | Guerra | ............. | 223/113 |
| 5,353,489 A * | 10/1994 | Weaver | ............. | 29/235 |
| 5,554,093 A | 9/1996 | Porchia et al. | | |
| 6,096,027 A * | 8/2000 | Layne | ............. | 606/1 |
| 6,149,304 A | 11/2000 | Hamilton et al. | | |
| 6,523,729 B1 * | 2/2003 | Gardon-Mollard | ....... | 223/112 |
| 6,581,760 B1 * | 6/2003 | Robertson | ........... | 206/5 |
| 6,942,223 B2 * | 9/2005 | Wang | ............. | 277/634 |
| 7,105,013 B2 * | 9/2006 | Durcan | ............. | 623/1.11 |
| 7,316,311 B2 * | 1/2008 | Downing-Perrault et al. | ..... | 206/278 |
| 7,371,181 B2 * | 5/2008 | Kozlowski et al. | ........ | 464/175 |
| 7,930,809 B2 * | 4/2011 | Huang | ............. | 29/235 |
| 2004/0093005 A1 | 5/2004 | Durcan | ............. | 606/194 |
| 2004/0177485 A1 * | 9/2004 | Lihod | ............. | 29/450 |
| 2009/0249600 A1 * | 10/2009 | Huang | ............. | 29/235 |
| 2011/0144624 A1 * | 6/2011 | Glaister | ............. | 604/524 |

FOREIGN PATENT DOCUMENTS

| | | |
|---|---|---|
| DE | 4403641 A1 | 2/1994 |
| GB | 2196396 A | 4/1988 |
| JP | 58102636 A * | 6/1983 |
| WO | WO 2004/002378 | 1/2004 |

* cited by examiner

*Primary Examiner* — Essama Omgba
(74) *Attorney, Agent, or Firm* — Knobbe Martens Olson & Bear LLP

(57) ABSTRACT

A replacement stretch type boot is applied to the tie rod shaft of a steering rack assembly using an application aid consisting of a sleeve of flexible sheet material which is applied over the tie rod end to provide a smooth surface for passage of the boot over the tie rod end.

6 Claims, 6 Drawing Sheets

REPLACEMENT OF STEERING RACK BOOTS

FIELD OF THE INVENTION

The present invention relates to the replacement of steering rack boots, and more particularly to a method of replacing the boot and to a fitting sleeve for use in that method.

BACKGROUND

Steering rack boots are typically in the form of a sleeve of bellows-like form mounted on the tie rod shaft to provide a seal between the shaft and the main housing of the steering rack in order to prevent ingress of dirt, mud, water, and other foreign matter into the housing itself and also into the joint at the inner end of the shaft. The boot is subject to deterioration over a period of time as a result of wear arising from the continual flexing of the boot and also as a result of contamination by oil, grease, and other matter thrown up from the road surface.

To replace a worn boot, the common practice is to disconnect the tie rod end from the steering arm or knuckle of the associated wheel and to remove the existing boot firstly by removing clamps at each end of the boot and then cutting the boot so that it can be pulled away and discarded. The tie rod end which is now free is itself removably connected to the tie rod shaft by a threaded coupling. For many standard types of boot, the tie rod end needs to be removed from the tie rod shaft to permit the fitting of the replacement boot as the boot cannot stretch sufficiently to pass over the tie rod end. This requires the steering rack to be readjusted to the correct steering geometry when the tie rod end is refitted onto the tie rod shaft. An alternative which enables the tie rod end to be maintained in position to preserve the existing steering geometry is to fit a replacement boot with greater stretch (a "stretch type boot") and to use an aid which facilitates passage of the replacement boot over the tie rod end and onto the tie rod shaft.

Conventionally, that aid is in the form of a plastic cone which snaps tightly onto the tie rod end. This is shown in FIG. 1, in which the tie rod end is designated 2, and the plastic cone is designated 4. FIG. 2 shows the steering rack boot 8 on the tie rod shaft 10 after both of its ends have passed over the cone 4. Although the cone 4 encloses the outer part of the tie rod end 2 and aids the initial movement of the end of the boot 8 onto the tie rod end 2, the main part of the tie rod end 2 is a body of a bulbous shape (shown at 2a) and not all of this is covered by the cone 4. The uncovered part of the tie rod end 2 is not smoothly finished but has rough and sometimes jagged surfaces. The two ends of the boot 8 need to be stretched to pass over the cone 4 and uncovered body part 2a, and due to the roughness of the surface of the body part 2a a lot of force is needed to push each of the ends of the boot 8 over the body part 2a. As the stretched end is under tension during this phase of the fitting, there is a risk of the end being cut by sharp edges or projections on the body part 2a and other uncovered parts of the tie rod assembly while it is being forced across the body part. Moreover, unless the tie rod end 2 is thoroughly cleaned prior to the fitting of the boot 8, any dirt and other foreign matter which is on the tie rod end may be introduced into the interior of the boot during this stage and this matter might enter into the interior of the rack housing and may cause serious damage to the steering mechanism.

SUMMARY

According to the present invention there is provided a method of applying a boot to the tie rod shaft of a steering rack assembly, the boot being able to stretch sufficiently to pass over a tie rod end, the method comprising applying over the tie rod end a sleeve of flexible sheet material, the sleeve having a closed end within which the tie rod end lies, and sliding the boot over the tie rod end by sliding the boot over the sleeve which thereby provides a smooth surface for passage of the boot.

The sleeve not only facilitates the passage of the boot over the tie rod end it also maintains the interior of the boot free from contamination by dirt, grease and other matter which might be present on the tie rod end.

Advantageously, the sleeve extends over the threaded connection and associated lock nut by which the tie rod end is coupled to the tie rod shaft in a conventional steering rack assembly. Advantageously, it also extends along the tie rod shaft to a position close to that at which the outer end of the boot will lie when installed so as to protect the boot from damage and contamination while it is moved along a major part of the length of the shaft.

Preferably, prior to fitting the boot, the exterior of the sleeve and/or the interior of the boot are lubricated.

Particularly advantageously, the sleeve is composed of a flexible sheet material of a wall thickness and strength such that it will not be pierced by rough or sharp edges as may typically exist on components of a steering rack assembly. Accordingly, the sleeve will isolate or enclose these edges to thereby prevent their damaging the boot during passage over the sleeve, and the sleeve itself will not tear under the stress of fitting the boot.

The present invention also provides a sleeve of flexible sheet material for use in the method defined above, the sleeve being closed at one end and of a size such that the tie rod end can be enclosed within the interior of the sleeve adjacent its closed end.

Advantageously the sleeve is formed from sheet material of such a strength and wall thickness that it will not be pierced by rough or sharp edges as may typically exist on components of a steering rack assembly. Accordingly, the sleeve will isolate or enclose these edges to thereby prevent their damaging the boot during passage over the sleeve.

In one practical form, the sleeve is of progressively reducing cross-sectional size from its closed end to its open end.

According to another aspect of the invention there is provided a replacement steering rack boot kit comprising a replacement boot of stretch type and a sleeve as defined above to facilitate fitting of the boot in the manner defined above.

BRIEF DESCRIPTION OF THE DRAWINGS

An embodiment of the invention will now be described by way of example with reference to the accompanying drawings in which.

DETAILED DESCRIPTION

Figure 1:
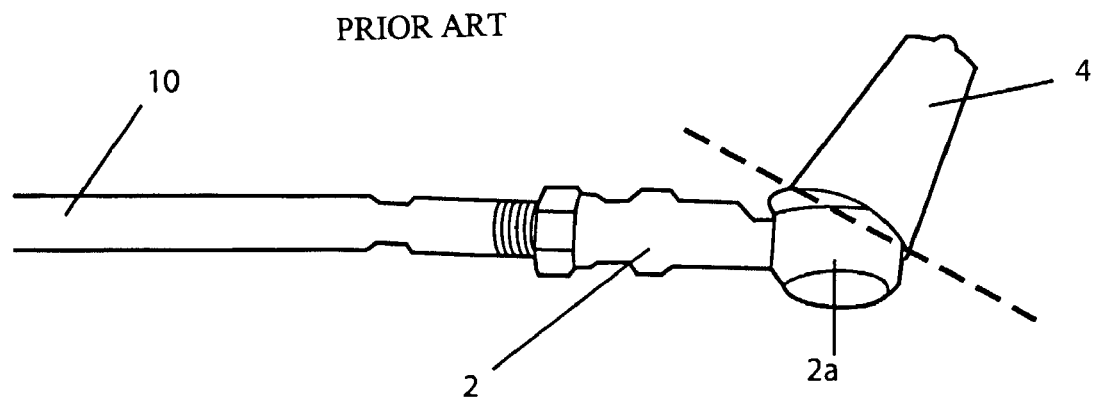
FIG. 1 is a view of a prior art device.
Figure 2:
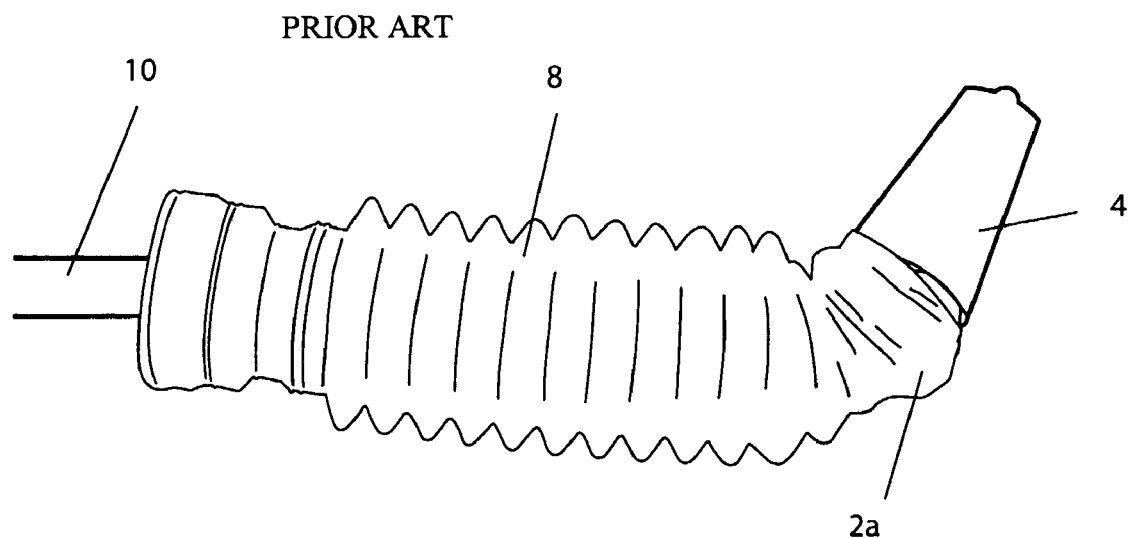
FIG. 2 is a view after, a steering rack boot has passed over the prior art device of FIG. 1.
Figure 3:
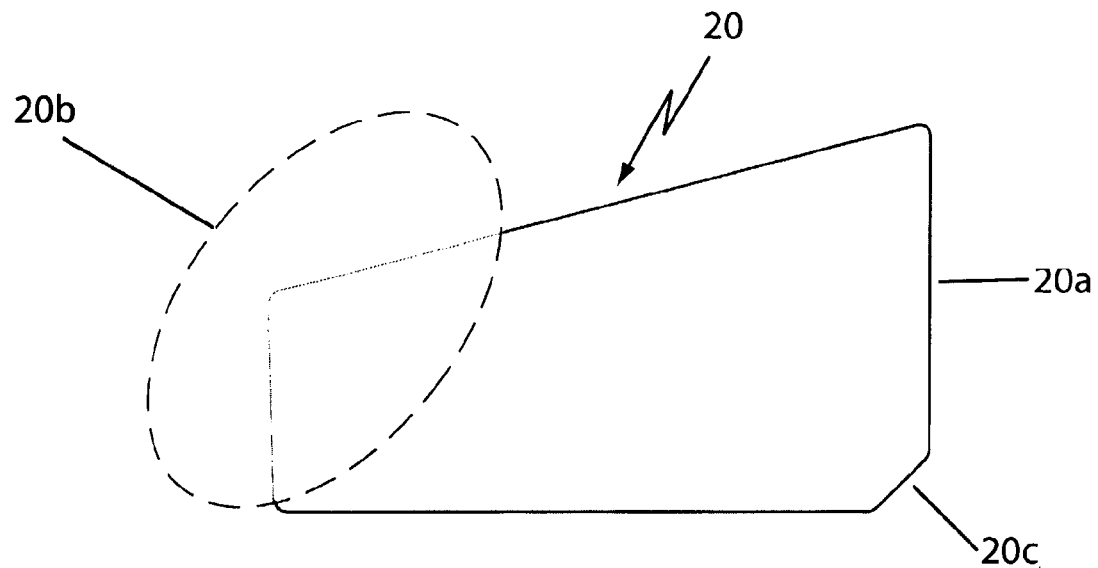
FIG. 3 is a view of a fitting sleeve in accordance with a preferred embodiment of the invention, the sleeve being shown in a flattened state assumed prior to use.
Figure 4:
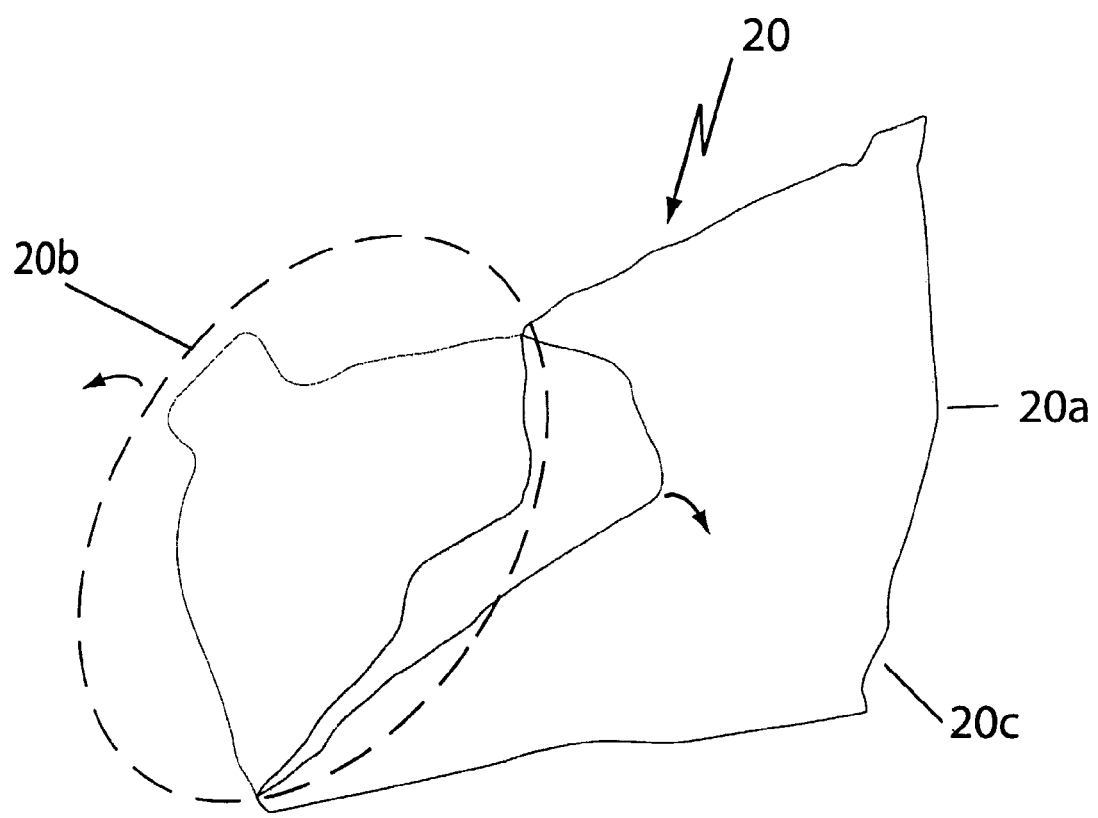
FIG. 4 is a perspective view showing the sleeve manipulated into a opened state for use.

In accordance with the preferred embodiment of the invention as shown in FIGS. 3 and 4, the boot fitting aid is in the form of an elongate tubular sleeve 20 of a relatively smooth flexible sheet material. Although it is preferred for the sheet to be of a suitable plastic material such as polyethylene, polypropylene or PVC, other flexible sheet materials having the characteristics necessary to fulfil the functions to be described can alternatively be used; examples include waxed flexible cardboard, rubberised fabric, fabric formed from flexible glass fibres, foil reinforced paper, plastic reinforced paper, cellophane and sheet material based on natural products such as corn starch or tapioca. The sleeve 20 is closed at one end 20a and the opening 20b at the other end of the sleeve is of a size to permit the open end of the sleeve to be slid over the bulbous body part 2a of the tie rod end 2 and then manipulated so that the entirety of the tie rod end 2 and the adjacent part of the tie rod shaft 10 will then extend longitudinally within the sleeve 20. The sleeve 20 thereby forms a smooth surface over which the boot can be slid while passing over the tie rod end, the bulbous body part 2a of the tie rod end being within the sleeve adjacent its closed end 20a.

Although the closed end 20a of the sleeve must be of a size to accommodate the bulbous body part 2a, the remainder of the sleeve 20 only needs to accommodate the rod-shaped part of the tie rod end 2 and the adjacent part of the tie rod shaft 10. For this reason it is preferred that the sleeve 20 reduces in cross-sectional size from its closed end 20a to its open end in order to avoid an excess of material when the sleeve has been applied and which might tend to impede passage of the boot. The reducing cross-sectional size or taper is clearly shown in the drawings and facilitates fitting of the boot and reduces the stress on the boot while fitting. With that configuration, the opening 20b at the forward end of the sleeve 20 is formed to extend partially along the forward part of the upper edge of the sleeve to enable the sleeve to be opened sufficiently widely for passage over the bulbous body part 2a of the tie rod end. It is preferred that the sleeve 20 has, at its closed end 20a, an angled corner 20c extending to the lower edge of the sleeve which further facilitates fitting of the boot and further reduces the stress on the boot while fitting. It is to be understood that the terms "upper" and "lower" and similar terms are used herein as relative terms with reference to what is likely to be the orientation of the sleeve in use; however this is not intended to confine the sleeve only to use in that orientation.

Figure 5A:
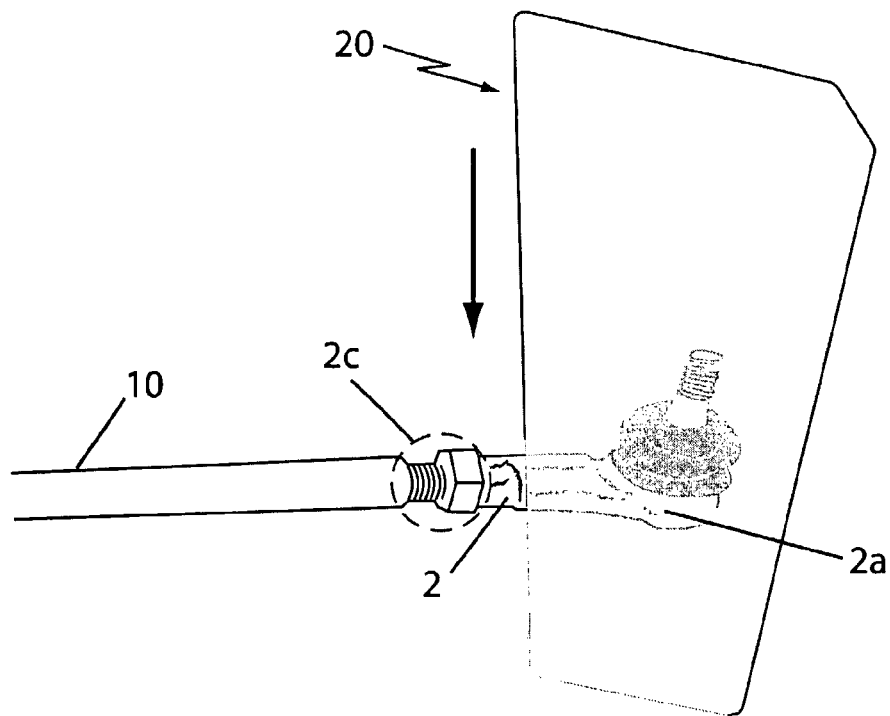
FIGS. 5A to 5C show successive stages in the application of the fitting sleeve onto a tie rod end and adjacent part of the tie rod shaft.
Figure 5B:
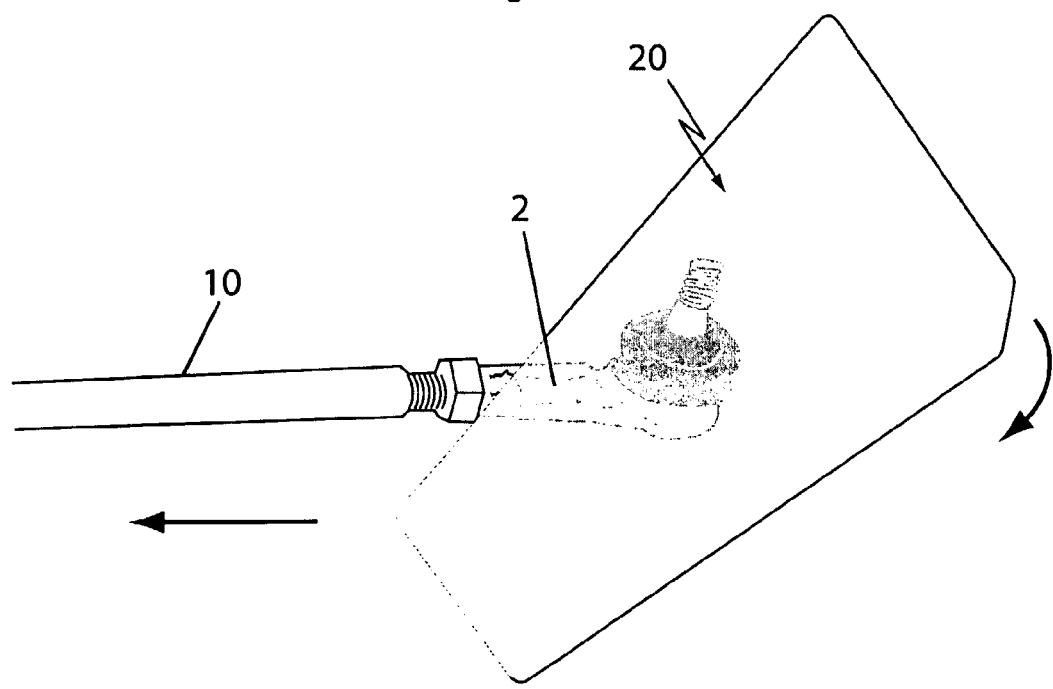
Figure 5C:
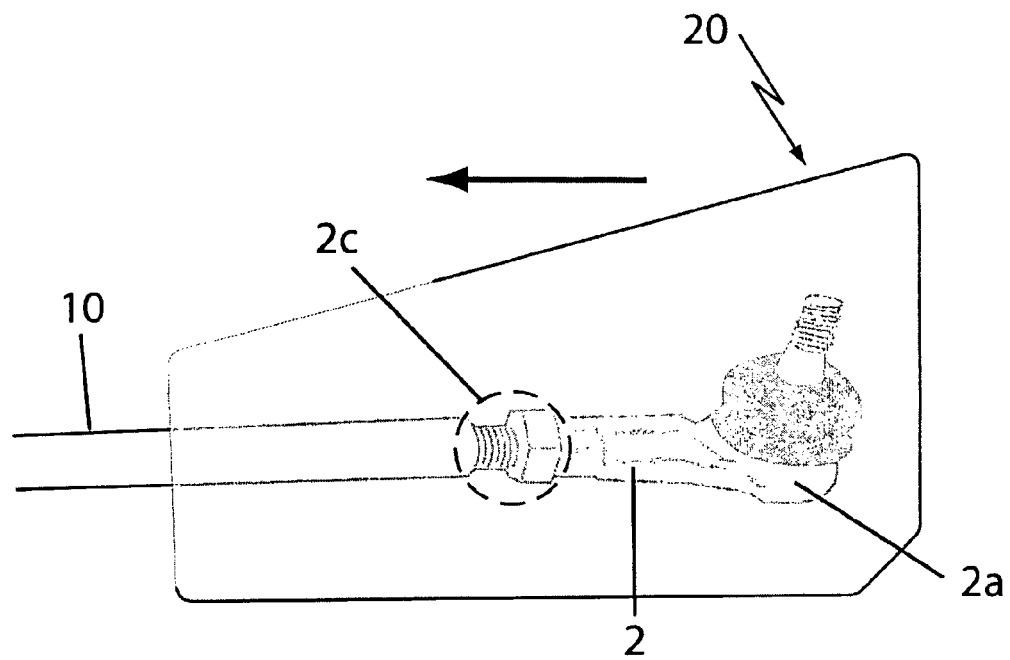
Figure 6A:
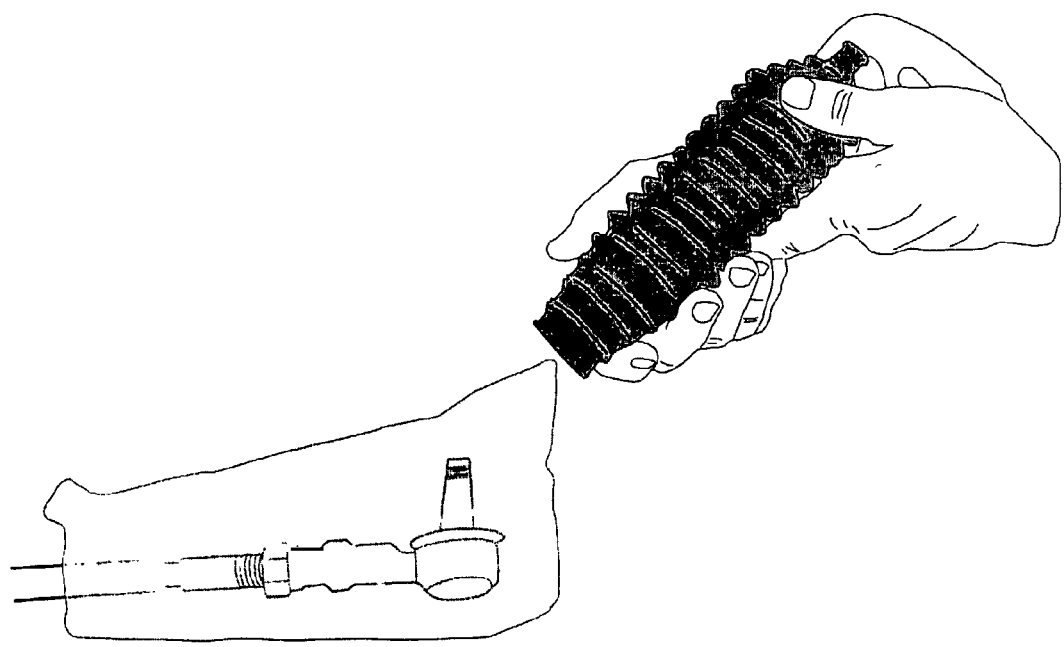
FIGS. 6A to 6D show successive steps in the application of a replacement rack boot of stretch type by sliding over the sleeve.
Figure 6B:
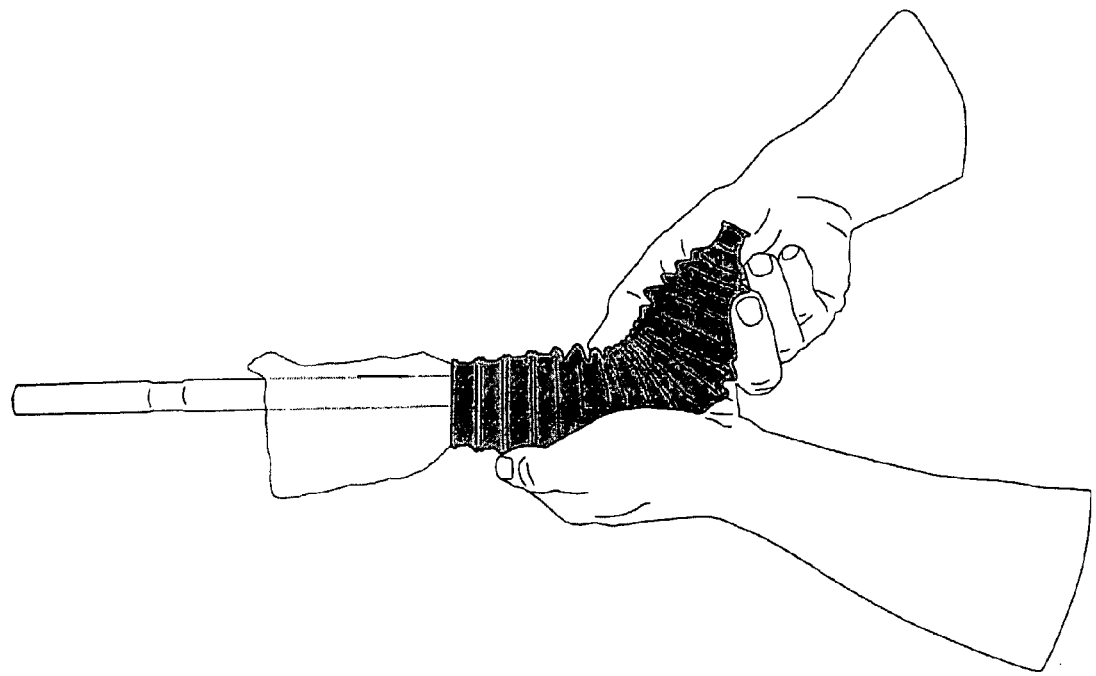
Figure 6C:
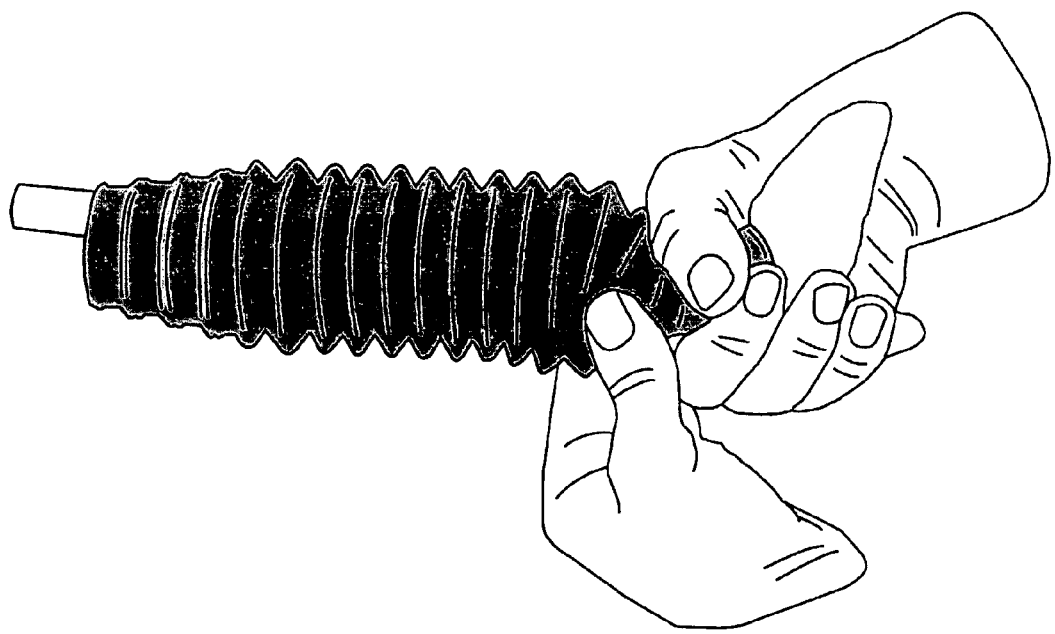
Figure 6D:
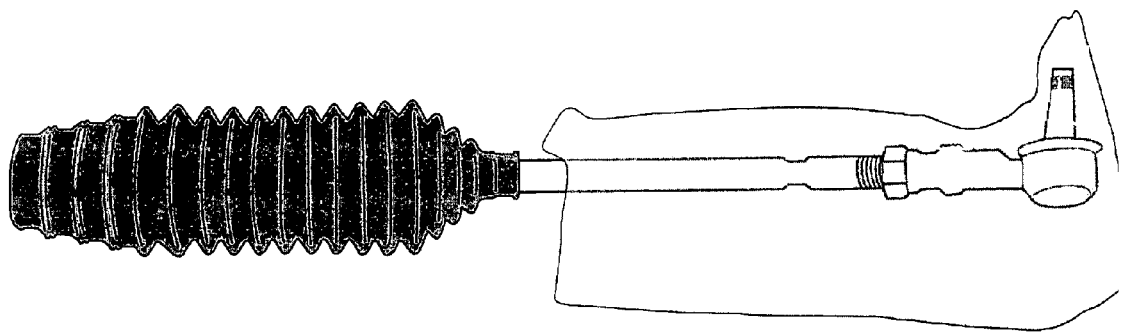

The steps of mounting the sleeve are shown in FIGS. 5A, 5B, and 5C. When the opening 20b is pulled apart, the sleeve 20 tends to orientate into an upright position and is then applied over the body part 2a of the tie rod end 2 as shown by the arrow in FIG. 5A. The sleeve 20 is then pulled down and around in the direction of the arrows in FIG. 5B and is then pulled onto the tie rod shaft 10 as shown by the arrow in FIG. 5C.

Following fitting of the sleeve 20, its outer surface is lubricated and/or the inside of the boot is lubricated. Although there are many forms of lubricant suitable for that purpose, by way of example a silicone lubricant can be sprayed onto the sleeve or engine oil could be brushed onto the sleeve. The inside of the new boot can also be lubricated using a silicone spray lubricant. The new boot can then be slid onto the tie rod end by passage over the sleeve 20 and then onto the tie rod shaft 10. When both ends of the boot are on the tie rod shaft 10, the boot can then be easily slid along the shaft into its final position for final fixing by clamping (see FIGS. 6A to 6D).

The sleeve 20 is of such a length that when fitted, it encloses the entire tie rod end 2 including the lock nut and threaded connection 2c to the tie rod shaft 10 which is another area that can have sharp edges, particularly the lock nut, and is usually very dirty from old grease, dirt, and road grime. Advantageously, the sleeve 20 is of a length that it also extends along a substantial part of the tie rod shaft 10 close to the position at which the outer end of the boot will lie in its fitted position, thereby facilitating passage of the boot over a significant extent of the tie rod shaft and preventing contamination by grease, dirt and other matter which may be present on the tie rod shaft. By way of example, a sleeve having a length of approximately 250 mm and a depth of approximately 150 mm at its closed end (when the sleeve is in a flattened state) will be suitable for use with a wide range of currently available steering racks to perform in the manner just described.

From what has been described, it will be understood that the sleeve provides a smooth surface over which the boot can slide during a significant part of the mounting procedure. It also protects the boot from possible damage by any sharp or jagged edges and also keeps the interior of the boot free from contamination by any dirt and grease present on the tie rod end and on the greater part of the tie rod shaft and as a result of this it is not necessary to clean the tie rod end or tie rod shaft prior to fitting. It will be appreciated that to perform the protective functions just described, the thickness and strength of the material from which the sleeve is formed must be such that it will not be penetrated by any sharp or jagged edges as may typically exist on tie rod ends. When the sleeve is made of plastic this function can be achieved by using a high strength flexible plastic approximately 80-150 microns in thickness.

The sleeve described can also be used in a similar way for removing an existing stretch type boot by sliding over the tie rod end rather than by cutting the boot. This may be needed to perform maintenance or repair work on the steering mechanism when the existing boot is in otherwise good condition and does not actually need to be replaced.

The sleeve can be supplied with replacement boots as part of an integrated repair kit.

The embodiment has been described by way of example only and modifications are possible within the scope of the invention.

What is claimed is:

1. A method of applying to a tie rod shaft of a steering rack assembly, a boot which is able to stretch sufficiently to pass over a tie rod end, the method comprising applying over the tie rod end a sleeve of flexible sheet material, the sleeve having a closed end within which the tie rod end lies, and sliding the boot over the tie rod end by sliding the boot over the sleeve which thereby provides a smooth surface for passage of the boot, wherein the sleeve is of a length to extend over a threaded connection and associated lock nut by which the tie rod end is coupled to the tie rod shaft, wherein the sleeve is of a length to extend along the tie rod shaft to a position close to that at which an outer end of the boot will lie when installed so as to protect the boot from damage and contamination while it is moved along a major part of the length of the shaft, and wherein the flexible sheet material is of a wall thickness and strength such that it will not be pierced by rough or sharp edges as may exist on components of a steering rack assembly, whereby the sleeve will isolate these edges to thereby prevent their damaging the boot during passage over the sleeve, and wherein the sleeve has, at its closed end, an angled corner extending to a lower edge of the sleeve.

2. A method according to claim 1, wherein the exterior of the sleeve and/or the interior of the boot are lubricated prior to fitting the boot.

3. A method according to claim 1, wherein the sleeve is of progressively reducing cross-sectional size from its closed end to its open end.

4. A method according to claim 1, wherein the sleeve is composed of a flexible plastic having a wall thickness of from approximately 80 to 150 microns.

5. A method according to claim 1, wherein the sleeve, when in a flattened state prior to use, is closed along a rear end edge to provide the closed end and along opposed upper and lower end edges extending forwardly from the rear end edge, and an open end of the sleeve opposite the closed end is defined by an open forward edge and an open part of the upper edge adjacent thereto whereby to provide a large size opening for application over the tie rod end.

6. A replacement steering rack boot kit for applying a replacement boot to a tie rod shaft of a steering rack assembly, the kit comprising:
   a replacement boot; and
   a sleeve of flexible sheet material, the sleeve being closed at one end and sized to enclose a tie rod end within an interior of the sleeve adjacent its closed end, wherein the replacement boot is sized to fit over the sleeve and the tie rod end, wherein the sleeve is of a length to extend over a threaded connection and associated lock nut by which the tie rod end is coupled to the tie rod shaft, wherein the sleeve is of a length to extend along the tie rod shaft to a position close to that at which an outer end of the boot will lie when installed so as to protect the boot from damage and contamination while it is moved along a major part of the length of the shaft, and wherein the flexible sheet material is of a wall thickness and strength such that it will not be pierced by rough or sharp edges as may exist on components of a steering rack assembly, whereby the sleeve will isolate these edges to thereby prevent their damaging the boot during passage over the sleeve, and wherein the sleeve has, at its closed end, an angled corner extending to a lower edge of the sleeve.

* * * * *